3,636,129
NORMAL PARAFFIN ALKYLATION USING FLUOROSULFONIC ACID AND GROUP V METAL FLUORIDE CATALYST
Paul Thomas Parker and Charles Newton Kimberlin, Jr., Baton Rouge, La., assignors to Esso Research and Engineering Company
Filed Feb. 18, 1970, Ser. No. 12,303
Int. Cl. C07c 3/54, 3/56
U.S. Cl. 260—683.47    7 Claims

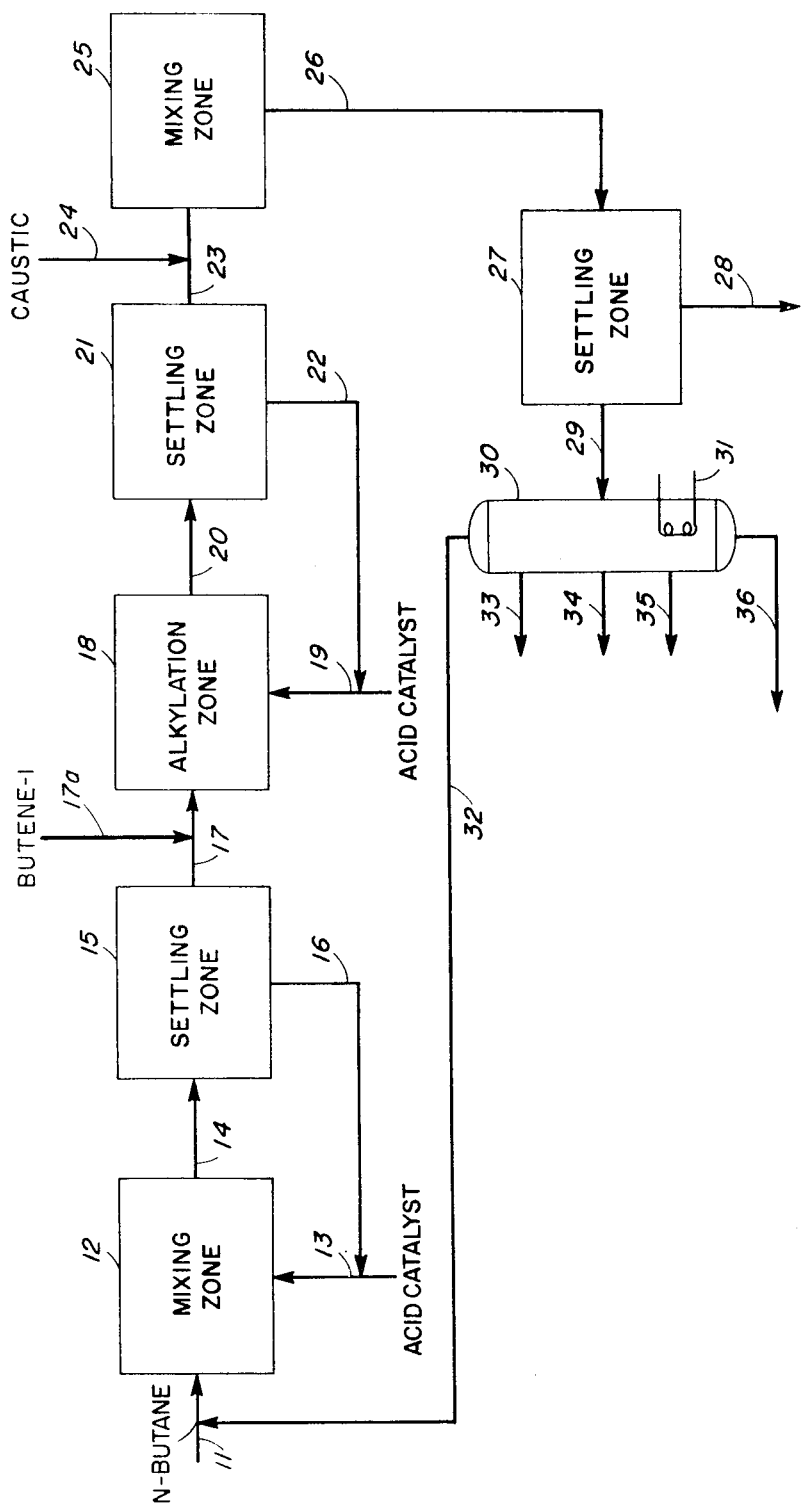

ABSTRACT OF THE DISCLOSURE

Normal paraffins containing from $C_4$ to $C_6$ carbon atoms are alkylated with $C_2$ to $C_5$ olefins in the presence of a catalyst comprised of fluorosulfonic acid and a Group V metal fluoride such as antimony pentafluoride at temperatures in the range of −40° to 250° F. The normal paraffin is first contacted with the catalyst composition at a temperature in the range of about 80° to 250° F. to form cations which are thereafter contacted with the olefin at a temperature in the range of about −40° to 100° F.

BACKGROUND OF THE INVENTION

Field of the invention

The present invention relates to an improved alkylation process. More particularly, the invention relates to the alkylation of nornmal paraffins with olefins in the presence of a liquid catalyst comprised of a Group V metal fluoride and fluorosulfonic acid.

Description of the prior art

The acid catalyzed addition of an alkane to an alkene to form a desired product is well known. Generally, the catalytic alkylation of paraffins involves the addition of an isoparaffin containing a tertiary hydrogen to an olefin. The process is used by the petroleum industry to prepare highly branched paraffins mainly in the $C_6$ to $C_9$ carbon range, which are high quality fuels for ignition engines. The process conditions required and the product composition depend on the particular hydrocarbons involved in the reaction.

The most important rate determining factor in the alkylation reaction is the hydride extraction step, i.e. the removal of an H− from the paraffin to form an alkyl cation. In the case of isoparaffins such as isobutane, this conversion to the cation is sufficiently rapid at low temperatures, e.g. in the order of 30° to 60° F. However, in the case of normal paraffins such as normal butane, the formation of the alkyl cation is very slow at ordinary alkylation temperatures. On the other hand, ionization of the normal paraffin occurs fairly rapidly at high temperatures but at these high temperatures the alkylation reaction produces large quantities of undesirable high and low molecular weight hydrocarbon products. It has now been found that these difficulties ordinarily experienced in the alkylation of normal paraffins with olefins can be eliminated or substantially minimized by the use of the acid catalyst composition and reaction temperature employed in the process of this invention.

SUMMARY OF THE INVENTION

In accordance with the invention, $C_4$ to $C_6$ normal paraffins are alkylated with $C_2$ to $C_5$ olefins in the presence of a catalyst comprised of fluorosulfonic acid and a Group V metal fluoride at temperatures in the range of about −40° to 250° F.

The normal paraffin is first contacted with the fluorosulfonic acid-Group V metal fluoride catalyst composition in a reaction zone maintained at 80° to 250° F., preferably 100° to 200° F. The intermediate hydrocarbon product mixture thus obtained is thereafter contacted with the olefin at a temperature in the range of about −40° to 100° F., preferably 0° to 100° F. when alkylating with ethylene and −40° to 30° F. when alkylating with propylene, butene or pentene.

The catalyst composition used in the process of the invention comprises fluorosulfonic acid and metal fluoride wherein said metal is selected from Group V of the Periodic Table such as antimony, arsenic, tantalum and niobium. The Periodic Table referred to is that described in "The Encyclopedia of Chemistry," Reinhold Publishing Corporation, second edition (1966) at page 790. Specific examples of these metal fluorides include antimony pentafluoride, arsenic pentafluoride, tantalum pentafluoride, niobium pentafluoride and the like. The catalyst composition is generally an equimolar mixture of the metal fluoride and fluorosulfonic acid. However, where a more fluid catalyst composition is desired, it will be convenient to use larger relative amounts of the fluorosulfonic acid which may function as a solvent. Accordingly, the catalyst composition may contain 1 to five or more moles of fluorosulfonic acid to 1 mole of the metal fluoride catalyst component. Similarly, other solvents such as sulfurylfluorochloride, sulfur dioxide, phosphorus oxyfluoride and the like may be used to prevent freezing of the catalyst mixtures at the alkylation reaction temperatures.

The olefins which are reacted include the $C_2$ to $C_5$ olefins such as ethylene, propylene, 1-butene, 2-butene, and pentene. Mixtures of these olefins may also be used.

The paraffinic hydrocarbons which are reacted with the olefins include the normal $C_4$ to $C_6$ paraffins, preferably butane or pentane and the like. Mixtures of these paraffins can also be used.

The amount of the metal fluoride-fluorosulfonic acid catalyst contacted with the reactants may range from about 0.01 to 100 parts by weight of the catalyst composition to one part by weight of the olefin present in the reaction mixture. Preferably, the amount of the catalyst will range from 1 to 10 parts by weight per part by weight of the olefin present.

The amount of paraffin contacted with the olefin in the alkylation zone will range from about 1 to 100 moles, preferably 2 to 20 moles, per mole of olefin contacted therewith.

The process of the invention is conducted as a batch or continuous operation. The apparatus employed may be of a conventional nature and may comprise a single reactor equipped with efficient stirring devices, such as mechanical agitator, jets of restricted internal diameter, turbo-mixers, etc. Unreacted reactants, acid catalyst, and heavy products of the reaction may be separated from the desired alkylate product and from one another by conventional means such as distillation and returned in whole or in part to the alkylation zone.

The pressures employed in the alkylation may range from about atmospheric to about 250 pounds per square inch gauge (p.s.i.g.), which pressures are sufficient to maintain the reactants in the liquid phase. Pressures in the range of about 10 to 100 p.s.i.g. are ordinarily employed. The time of contact is subject to wide variation, the length of residence time being dependent in part upon the temperature and catalyst concentration employed. In general, contact times between about 0.1 minute and 2 hours, usually 1 to 60 minutes are employed.

When the normal paraffin is mixed with the catalyst prior to contact with the olefin, the amount of the catalyst composition first contacted with the normal paraffin will range from about 0.1 to 80 parts by weight, preferably 0.2 to 10 parts by weight of the catalyst per part by weight of the normal paraffin. The amount of the catalyst composition contacted with the intermediate hydrocarbon product may range from about 0.1 to 80 parts by weight, preferably 0.2 to 10 parts by weight of the catalyst per part by weight of the intermediate hydrocarbon product. In such a reaction sequence, alkyl cations are formed from the reaction of the normal paraffins and catalyst composition. The alkyl cations formed are then reacted with the olefins at lower temperatures in the presence of the catalyst composition to produce the desired alkylate product. The effect of this process is the achievement of rapid alkylation rates and the minimization of undesirable light and heavy hydrocarbon products.

BRIEF DESCRIPTION OF THE DRAWING

The drawing is a flow diagram of a preferred embodiment of the invention. In this connection, the invention will be particularly described with reference to the alkylation of normal butane with butene-1 in the presence of antimony pentafluoride and fluorosulfonic acid as catalyst.

Referring now to the drawing in detail, numeral 11 designates a charge line by way of which normal butane feed is introduced into mixing zone 12 from a source not shown. An acid catalyst composition consisting of equimolar proportions of antimony pentafluoride and fluorosulfonic acid is introduced into zone 12 via line 13 and mixed with the normal butane feed at a temperature of about 150° F. for a period of about 30 minutes. The amount of catalyst composition charged to mixing zone 12 is 50 pounds per 100 pounds of butane. The mixture from zone 12 is discharged therefrom by line 14 and sent to settling zone 15 wherein there is formed a hydrocarbon phase and an inorganic phase containing the acid catalyst which is essentially insoluble in the hydrocarbon phase. The separated acid catalyst from zone 15 is then introduced into line 13 via line 16 for reuse in the mixing zone. The separated hydrocarbon phase is discharged from settling zone 15 by means of line 17 and contacted therein with butene-1 introduced via line 17a. The amount of butene-1 is 10 pounds per 100 pounds of butane. The feed to be alkylated is contacted at 0° F. with an acid catalyst consisting of equimolar proportions of antimony pentafluoride and fluorosulfonic acid which is introduced into the alkylation zone via line 19. The amount of catalyst composition charged to alkylation zone 18 is 50 pounds per 100 pounds of hydrocarbon phase introduced into the alkylation zone.

The residence time in the alkylation zone is about 10 minutes and the alkylate product is thereafter discharged from zone 18 by line 20 and delivered to settling zone 21 wherein there is formed a hydrocarbon phase and an inorganic phase containing the acid catalyst. The separated acid catalyst from zone 21 is then introduced into line 19 via line 22 for reuse in the alkylation zone. The separated hydrocarbon product phase is then discharged from settling zone 21 by means of line 23 and contacted therein with caustic (e.g. 20 wt. percent sodium hydroxide) which is introduced into line 23 via line 24 and intimately fixed therewith in mixing zone 25. The amount of caustic is 10 pounds per 100 pounds of hydrocarbon phase. The hydrocarbon-caustic mixture is withdrawn from the mixing zone by means of line 26 which introduces the mixture into settling zone 27 wherein the caustic phase is permitted to separate from the hydrocarbon product phase. The caustic phase and the hydrocarbon phase are withdrawn from the settling zone via lines 28 and 29, respectively.

The hydrocarbon alkylate product from settling zone 27 is introduced into a separation zone 30 illustrated as a distillation zone which is provided with a heating means such as illustrated by steam coil 31 and with lines 32, 33, 34, 35 and 36. Conditions of temperature and pressure are adjusted in zone 30 to recover the alkylate product either in one fraction by line 36 or in several fractions by lines 33, 34, 35 and 36 while unreacted $C_4$ feed may be discharged by line 32 and preferably recycled to mixing zone 12 via lines 32 and 11.

The process scheme illustrated in FIG. 1 wherein a different acid catalyst charge is used in each stage has the advantage that it permits the use of different acid catalyst compositions in each stage or reaction zone. However, it is possible to use the same catalyst in each stage or reaction zone. This is conveniently done by failing to separate the acid catalyst phase from the hydrocarbon phase produced in mixing zone 12 of FIG. 1 and by eliminating the charge of fresh acid catalyst to alkylation zone 18 of FIG. 1.

The invention will be further understood by reference to the following examples which also include a preferred embodiment of the invention.

DESCRIPTION OF A PREFERRED EMBODIMENT

This example illustrates the improved product quality which is obtained in the two-stage process of the invention.

In this example, 0.84 mole of normal butane, 4 ml. of an equimolar mixture of $HSO_3F$ and $SbF_5$ and 2 ml. of $HSO_3F$ were added to a 300 ml. glass-lined autoclave and heated with stirring at 140° F. for 15 minutes. The mixture was then cooled to about 78° F. and 0.175 mole of ethylene was incrementally added thereto over a period of about 95 minutes by adding essentially equal portions of ethylene about every 7 minutes while maintaining the reaction temperature at about 78° F. After addition of the ethylene was completed, the reactor contents were stirred for about 10 minutes and then removed for analysis. The product had the following analysis:

PRODUCT ANALYSIS ON A $C_4$–FREE BASIS

| | Weight percent |
|---|---|
| 2-methyl butane | 34.4 |
| n-pentane | 4.1 |
| 2,2-dimethyl butane | 6.4 |
| 2,3-dimethyl butane+2-methyl pentane | 20.7 |
| 3-methyl pentane | 4.9 |
| n-hexane | 1.2 |
| $C_7$ hydrocarbons | 12.4 |
| $C_8$ and higher hydrocarbons | 15.9 |

It is to be understood that the examples presented herein are intended to be merely illustrative of the invention and not limiting it in any manner; nor is the invention to be limited by any theory regarding its operability. The scope of the invention is to be determined by the appended claims.

What is claimed is:

1. An improved process for the alkylation of $C_2$ to $C_5$ olefins with $C_4$ to $C_6$ normal paraffins which comprises first contacting said paraffins with a catalyst comprising fluorosulfonic acid and a Group V metal fluoride at a temperature in the range of 80° to 250° F. to form an intermediate product containing alkyl cations and thereafter contacting said intermediate product with said olefins in the presence of a catalyst comprising fluorosulfonic acid and a Group V metal fluoride at −40° to 100° F.

2. The process of claim 1 wherein said olefin is ethylene and said intermediate product is contacted therewith at a temperature in the range of about 0° to 100° F.

3. The process of claim 1 wherein said olefin is propylene, butene or pentene and said intermediate product is contacted therewith at a temperature in the range of about −40° to 30° F.

4. The process of claim 2 wherein said Group V metal fluoride is antimony pentafluoride.

5. The process of claim 3 wherein said Group V metal fluoride is antimony pentafluoride.

6. The process of claim 4 wherein said normal paraffin is normal butane.

7. The process of claim 5 wherein said normal paraffin is normal butane.

References Cited

UNITED STATES PATENTS

| | | | |
|---|---|---|---|
| 2,313,103 | 3/1943 | Thomas | 260—683.47 |
| 2,387,162 | 10/1945 | Matuszak | 260—683.58 |
| 2,396,486 | 3/1946 | Ballard | 260—683.58 |

DELBERT E. GANTZ, Primary Examiner

G. J. CRASANAKIS, Assistant Examiner

U.S. Cl. X.R.

260—683.58, 683,64